(12) United States Patent
Chrissos et al.

(10) Patent No.: US 8,056,856 B2
(45) Date of Patent: Nov. 15, 2011

(54) SUPPORT BEAM SHEAR FITTING

(75) Inventors: Philip O. Chrissos, Maryland Heights, MO (US); James Greenwood, St. Peters, MO (US); James B. Warner, Glendale, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/825,809

(22) Filed: Jun. 29, 2010

(65) Prior Publication Data

US 2010/0263193 A1    Oct. 21, 2010

Related U.S. Application Data

(62) Division of application No. 11/759,415, filed on Jun. 7, 2007, now Pat. No. 7,770,844.

(51) Int. Cl.
*B64C 1/22* (2006.01)
*B64C 1/06* (2006.01)

(52) U.S. Cl. .................................. 244/118.1; 244/131

(58) Field of Classification Search ............... 244/137.1, 244/131, 118.1, 117 R, 119, 129.1, 118.5, 244/118.2
See application file for complete search history.

(56) References Cited

U.S. PATENT DOCUMENTS

| 2,259,624 | A | 10/1941 | Dornier |
| 2,276,391 | A | 3/1942 | Hathorn |
| 2,325,900 | A | 8/1943 | Anderson |
| 3,363,372 | A | 1/1968 | Raynes |
| 3,899,092 | A | 8/1975 | Nordstrom |
| 6,554,225 | B1 | 4/2003 | Anast et al. |
| 2007/0102839 | A1 | 5/2007 | McGowan et al. |

FOREIGN PATENT DOCUMENTS

EP    1935782 B1    12/2007

*Primary Examiner* — Tien Dinh
(74) *Attorney, Agent, or Firm* — Caven & Aghevli LLC

(57) ABSTRACT

Methods of securing a support beam to a structure such as a cargo roller tray or a passenger cabin is achieved using a shear fitting. The shear fitting has a back plate which fastens to the support beam. The shear fitting additionally has parallel lugs which extend from the back plate and fasten to the structure. Web extenders which extend from the shear fitting perpendicular to the lugs may additionally be used to further fasten the support beam to the structure.

18 Claims, 6 Drawing Sheets

SUPPORT BEAM SHEAR FITTING

CROSS REFERENCE TO RELATED PATENT APPLICATIONS

This patent application is a divisional application of co-pending, commonly owned U.S. patent application Ser. No. 11/759,415, filed Jun. 7, 2007, entitled "Cargo Roller Tray Shear Fitting," which is hereby incorporated in its entirety by reference.

TECHNICAL FIELD

Embodiments of the disclosure relate to shear fittings in general and shear fittings used to fasten structures to support beams of aircrafts.

BACKGROUND

Cargo roller trays are used in vehicles (e.g., air craft, ships, trucks, etc.) and storage locations (e.g., holds, containers, and warehouses, etc.) to speed the movement of cargo. Typically, the cargo roller trays are joined to structural supports (e.g., floor beam, floor joists, etc) or a floor using fasteners.

The cargo roller trays in the past have been attached to structural supports by positioning the cargo roller tray on the support, drilling holes through both the cargo roller tray and the support, and then inserting fasteners though the holes. This fastening process required the installer to drill holes and to clean up the drill shavings after the holes were drilled. This process also required the use of backing plates for the fasteners, since the tension in the fastener held the cargo roller tray in position.

In an effort to speed the assembly process, both the support and the cargo roller tray are predrilled. However, when the holes in the cargo roller tray and the support did not line up, re-work was required Accordingly, there is a need for a shear fitting that can fasten a structure such as a cargo roller tray to the support such that re-work is minimized when using predrilled components.

SUMMARY

Embodiments of the disclosure may advantageously address the problems identified above by providing, in one embodiment, a shear fitting for joining a structure such as a cargo roller tray and/or at least a portion of a passenger cabin to a support beam. The shear fitting includes a base plate and parallel lugs extending from the base plate.

The shear fitting may include a base plate having a slot to fasten the shear fitting to the support beam. The shear fitting may additionally include parallel lugs having lug apertures to fasten the shear fitting to the structure. The slot may permit the shear fitting to shift (traverse) a predetermined distance along a length of the support beam.

In some situations, the shear fitting may be used in aircrafts to join structures such as an aircraft cargo roller tray and/or at least a portion of a passenger cabin to a support beam.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

The accompanying drawings incorporated in and forming part of the specification illustrate several embodiments of the disclosure. In the drawings.

Reference will now be made in detail to embodiments of the disclosure, examples of which are illustrated in the accompanying drawings.

DETAILED DESCRIPTION

The use of the disclosed shear fitting may speed joining a cargo roller tray to a support and may reduce the amount of re-work when assembling pre-drilled components.

Figure 1:
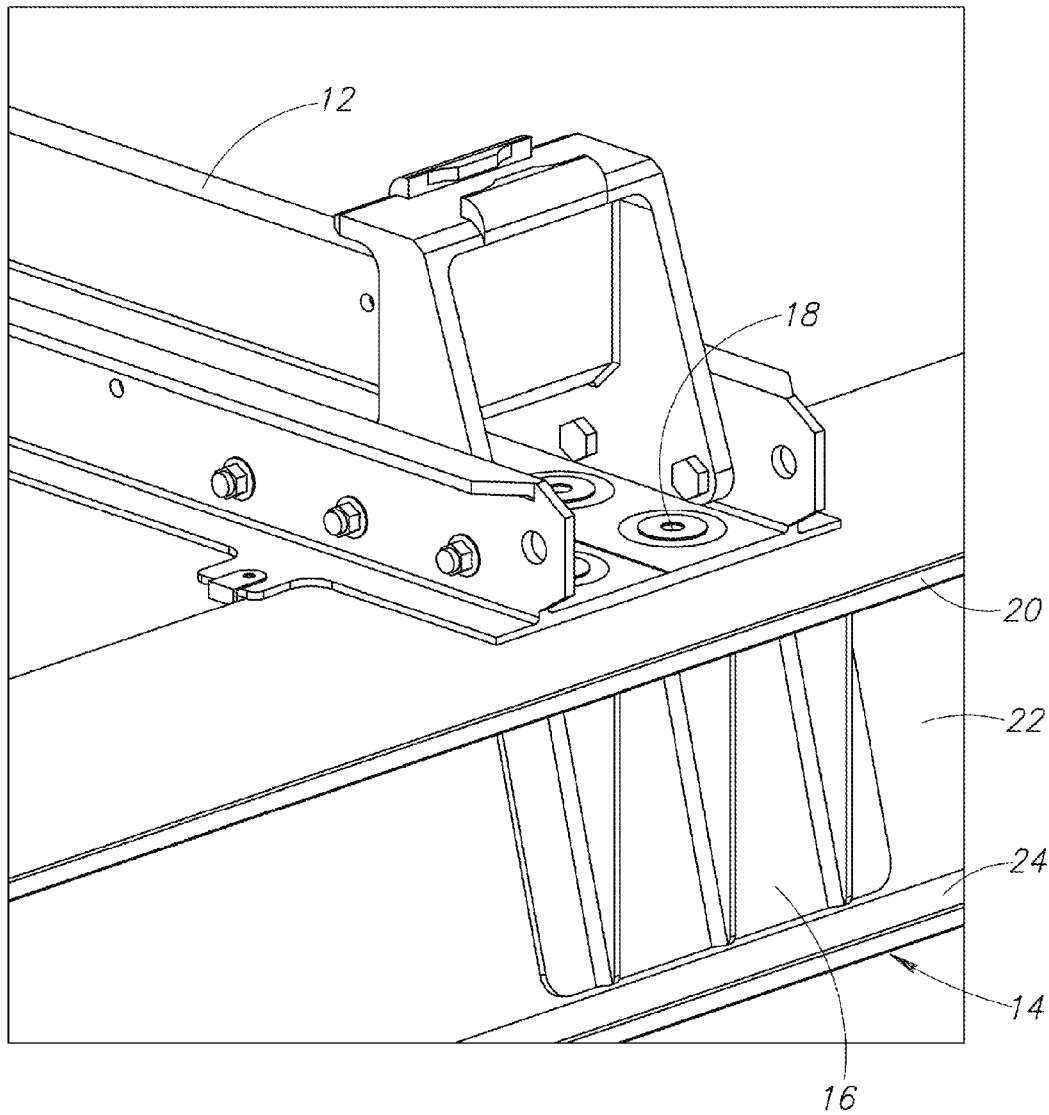
FIG. 1 illustrates a method of joining a cargo roller tray to a support as provided in the related art.

FIG. 1 shows an example from the related art of a cargo roller tray 12 joined to support 14 using fasteners 18 and backing plate 16. Backing plate 16 is used to spread the load since the tension of fasteners 18 holds the cargo roller tray 12 in position.

Figure 2A:
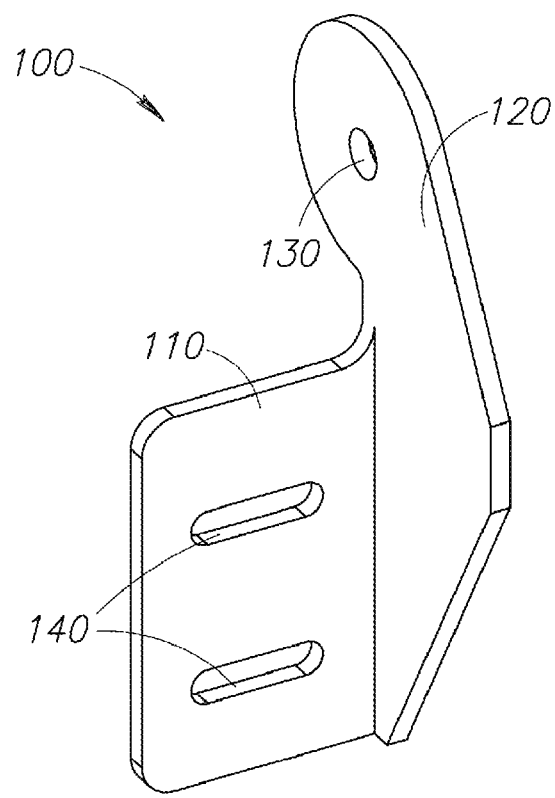
FIGS. 2A and 2B illustrate a shear fitting with a single lug.

FIG. 2 illustrates one embodiment of a shear fitting that may be used to join a cargo roller tray to a support. Shear fitting 100 may have a back 110. Typically, back 110 has at least two slots 140 through which shear fitting 100 may be fastened to the support. In some embodiments there may be one slot and in others there may be more than two slots. The number of slots depends on the size and loads on the fasteners. The slots 140 permit the position of the shear fitting 100 to shift. This shift may enable joining the cargo roller tray to the support without the rework associated with holes in the cargo roller tray that do not align with holes in the support.

The shear fitting 100 may also have a lug 120 with a hole or aperture 130. The lug projects from the back 110. In some embodiments the angle between the lug 120 and back 110 may be approximately 90 degrees. In other embodiments the angle between the lug 120 and back 110 may be an acute or obtuse angle.

Figure 2B:
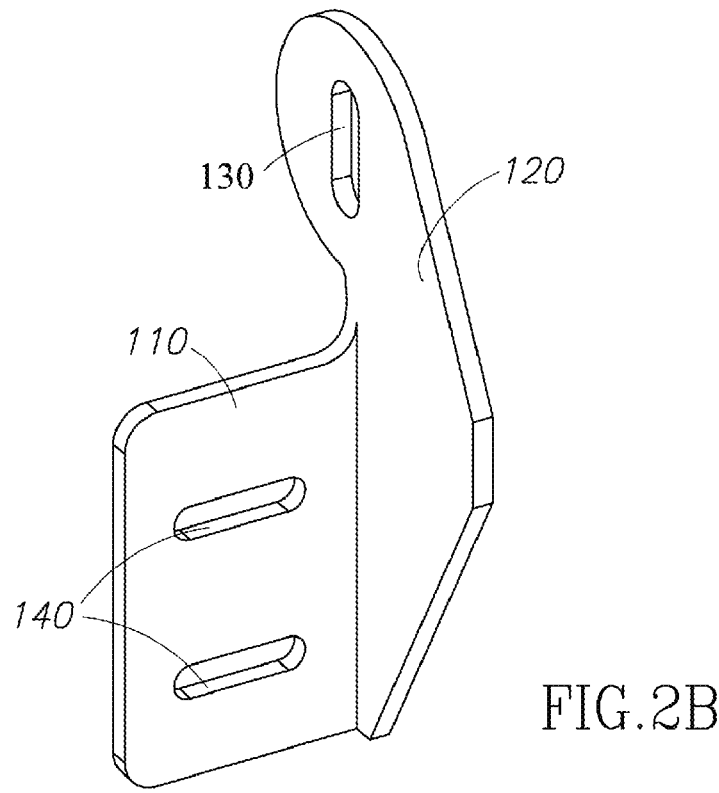

The aperture 130 permits the shear fitting to be fastened to the cargo roller tray. In some embodiments, such as illustrated in FIG. 2B, the aperture 130 may be oversized so that the aperture will be capable of receiving a fastener even if the corresponding hole in the cargo roller tray is at its worst case position, but still in tolerance. In other embodiments, aperture 130 may be a slot. In further embodiments the slot in the lug may be located at approximately 90 degrees to the slot(s) 140 in the back 110.

Figure 3:
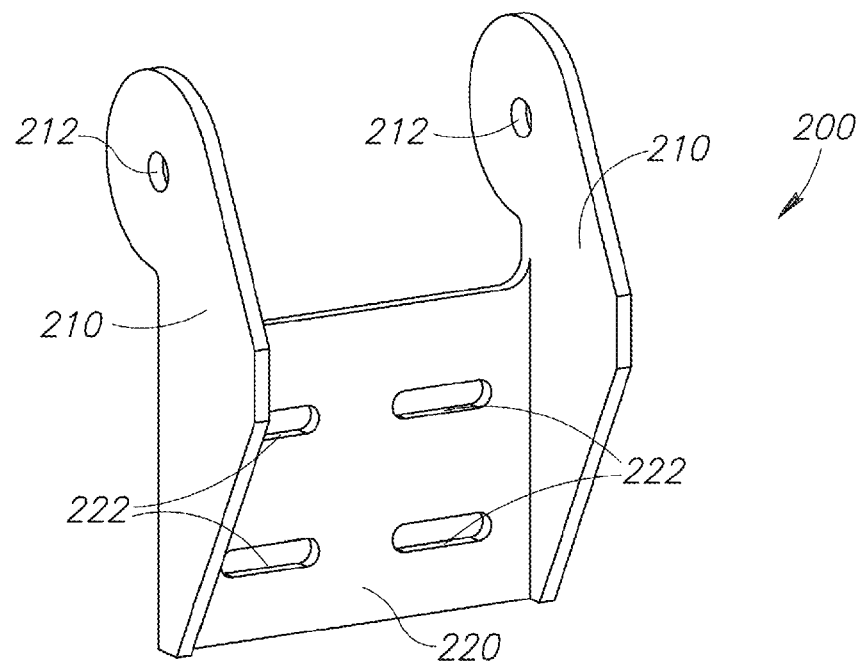
FIG. 3 illustrates a first embodiment of a shear fitting with two lugs.

FIG. 3 illustrates a second embodiment of shear fitting 200. In this embodiment the shear fitting 200 has a back 220 and two lugs 210. Each lug may have an aperture 212. The apertures are similar to the aperture 130 discussed above.

Similar to the back 110 discussed above, back 220 may have one or more slots 222. Slots 222 are similar to slots 140 discussed above.

Figure 4:
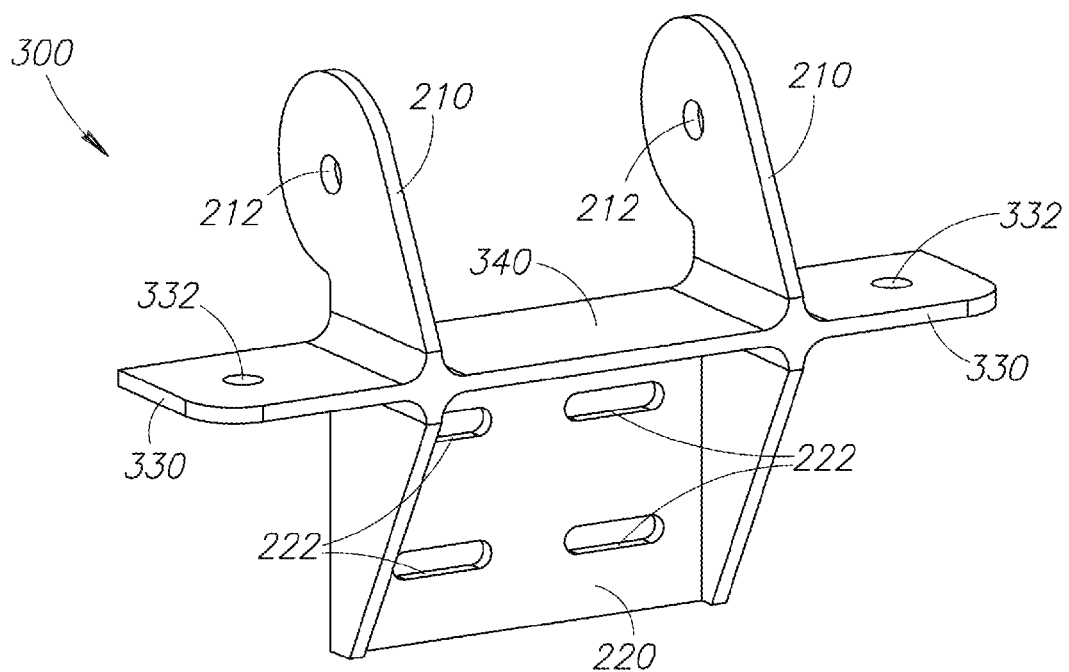
FIG. 4 illustrates a second embodiment of a shear fitting with two lugs.
Figure 5:
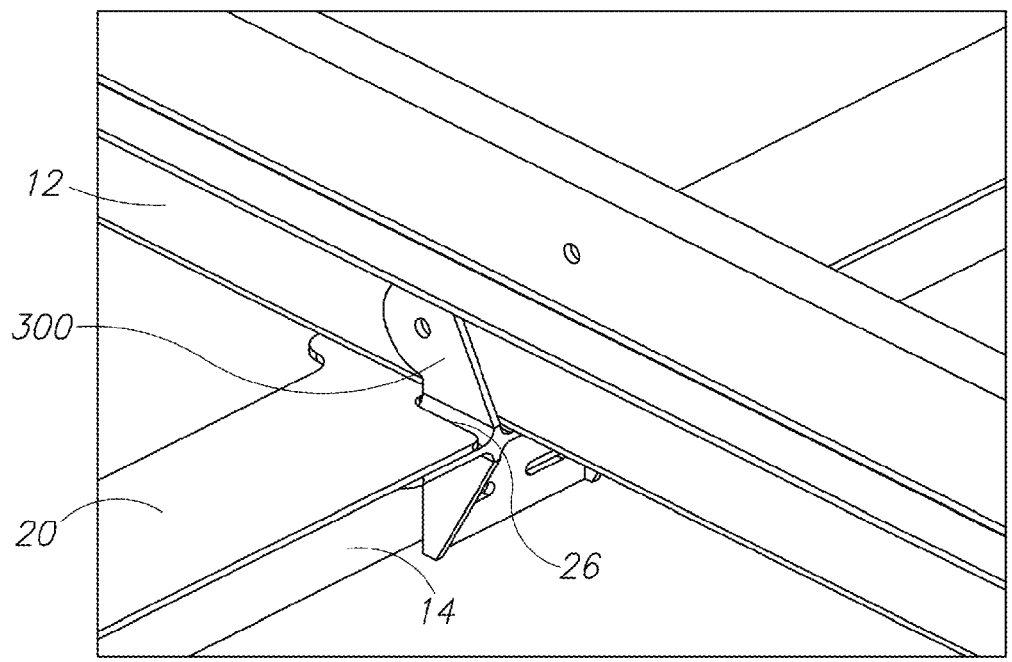
FIGS. 5 and 6 illustrate the second embodiment of the shear fitting with two lugs joining a cargo roller tray to a support.
Figure 6:
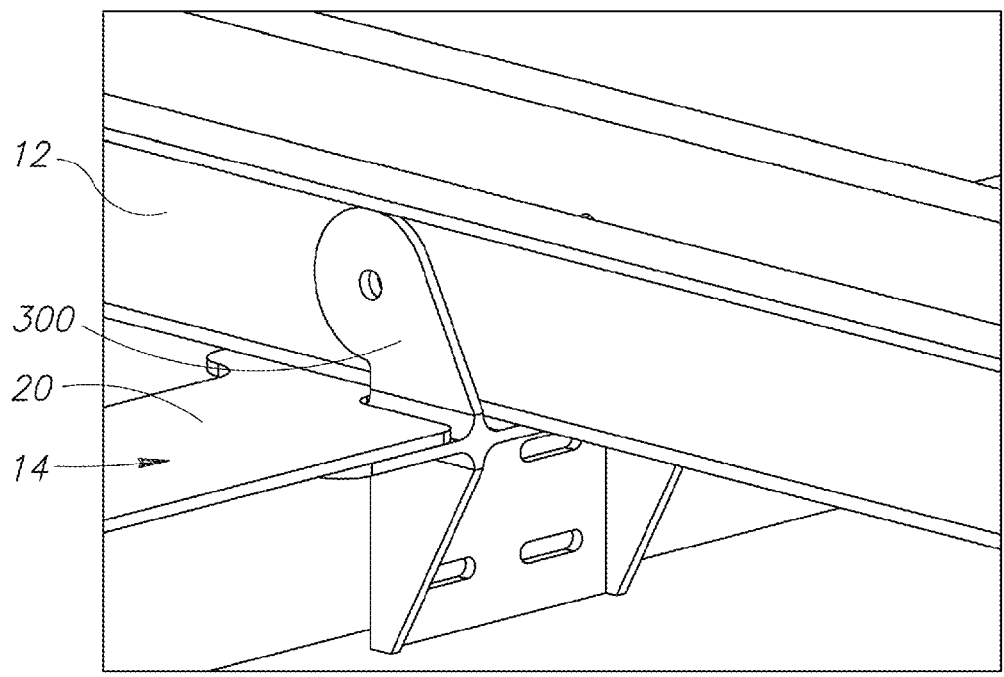

FIG. 4 illustrates a modification of the embodiment shown in FIG. 3. A similar modification may be made to the embodiment shown in FIG. 2. As illustrated in FIGS. 5 and 6, this modification may be advantageously used when a portion of a flange 20 on a support beam 14 is removed or the support beam is manufactured with a notch 26 for installation of the shear fitting 300.

In the embodiment shown in FIG. 4 the shear fitting 300 includes a web 340 and web extensions 330. The remaining portions of shear fitting 300 are similar to shear fitting 200 discussed above. The web extensions 330 may each include an aperture 332. Aperture 332 is configured to permit the shear fitting 300 to be fastened to the flange on a support beam.

The addition of web 340 and web extensions 330 help mitigate the loss of structural strength caused by the notch 26 in the flange 20 of the support beam 14 in which the shear fitting 300 is installed.

The shear fittings disclosed herein may be formed from metal using current or future metal forming techniques, e.g., casting, machining, forging, etc. The shear fittings may also be formed from plastic, glass reinforced plastic, composites, etc. using current or future forming techniques, e.g., molding, machining, etc. The materials used may be selected based on the strength and weight requirements of a particular application.

Figure 7:
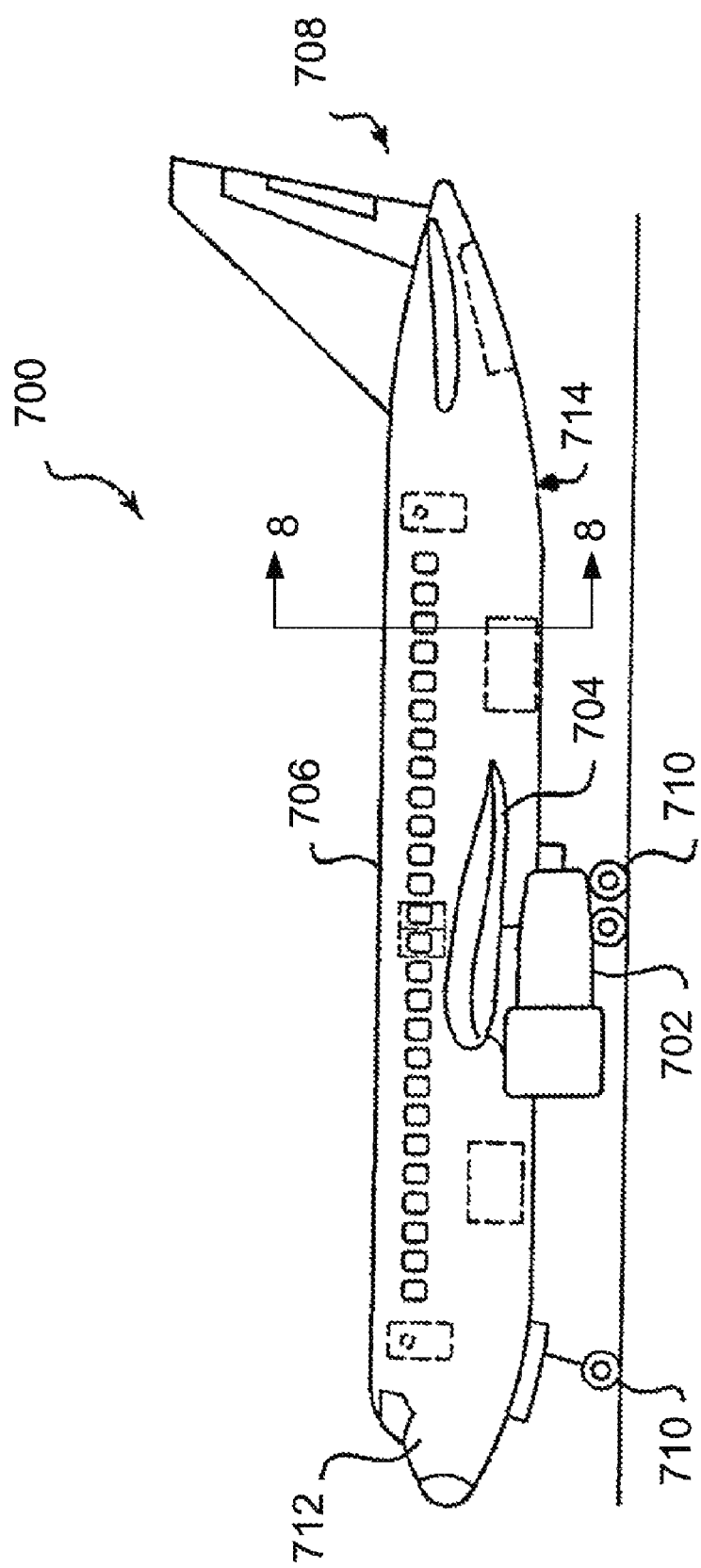
FIG. 7 illustrates an exemplary aircraft that may contain one of the embodiments illustrated above.

Referring now to FIG. 7, a side elevation view of an aircraft 700 having one or more of the disclosed embodiments is shown. With the exception of the embodiments according to the present disclosure, the aircraft 700 typically includes components and subsystems generally known in the pertinent art, and in the interest of brevity, will not be described further. The aircraft 700 generally includes one or more propulsion units 702 that are coupled to wing assemblies 704, or alternately, to a fuselage 706 or even other portions of the aircraft 700. Additionally, the aircraft 700 also includes a tail assembly 708 and a landing assembly 710 coupled to the fuselage 706. In some embodiments the fuselage 706, tail assembly 708 and nose assembly 712 may form an airframe 714. In other embodiments the airframe may also include wings 704.

The aircraft 700 further includes other systems and subsystems generally required for the proper operation of the aircraft 700. For example, the aircraft 700 includes a flight control system (not shown in FIG. 7), as well as a plurality of other network, electrical, EC, mechanical and electromechanical systems that cooperatively perform a variety of tasks necessary for the operation of the aircraft 700. Accordingly, the aircraft 700 is generally representative of a commercial passenger or cargo aircraft, which may include, for example, the 737, 747, 757, 767 and 777 commercial aircraft available from The Boeing Company of Chicago, Ill. Although the aircraft 700 shown in FIG. 7 generally shows a commercial aircraft, it is understood that the various embodiments of the present disclosure may also be incorporated into flight vehicles of other types. Examples of such flight vehicles may include manned or even unmanned military aircraft, rotary wing aircraft, ballistic flight vehicles or orbital vehicles, as illustrated more fully in various descriptive volumes, such as Jane's All The World's Aircraft, available from Jane's Information Group, Ltd. of Coulsdon, Surrey, UK. Additionally, those skilled in the art will readily recognize that the various embodiments of the present disclosure may also be incorporated into terrestrial or even marine vehicles.

Figure 8:
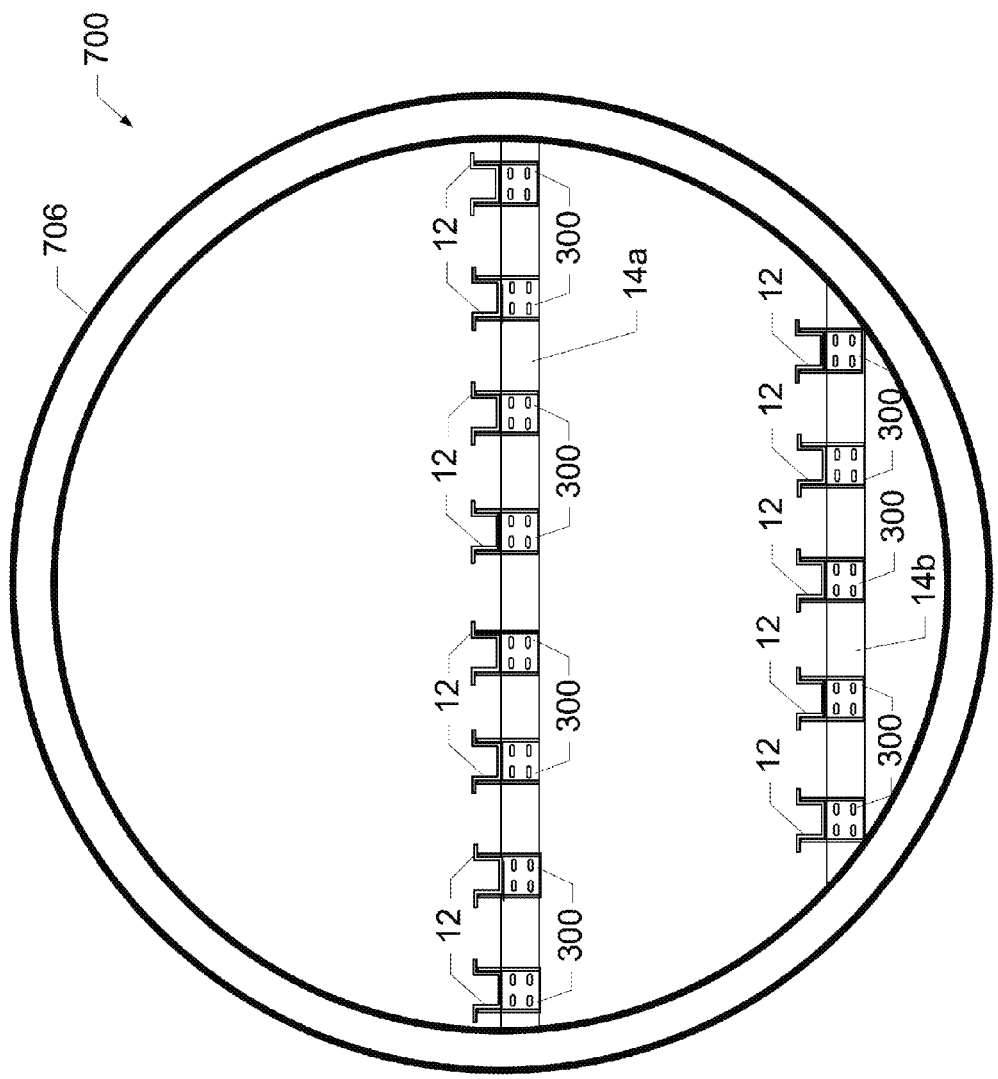
FIG. 8 illustrates a cross-section of the aircraft illustrated in FIG. 7.

As shown in the exemplary aircraft cross section in FIG. 8, the aircraft 700 may include one or more of the embodiments of the shear fitting 300, which may be incorporated into various portions of the aircraft 700. In the embodiment shown in FIG. 8, an upper support 14a supports a plurality of cargo roller trays 12. The roller trays 12 are joined to upper support 14a with shear fittings 300. Similarly, a lower support 14b supports a plurality of cargo roller trays 12. The cargo roller trays 12 are joined to lower support 14b with shear fittings 300. The embodiment shown in FIG. 8 may be used in an airplane 700 configured to carry primarily cargo. In an airplane configured to carry passengers, the upper support beam would be configured to support the passenger cabin instead of the cargo roller trays.

The above-described shear fittings enable joining cargo roller trays to supports. These and other devices described herein may provide significant improvements over the current state of the art, potentially providing for an assembly process with reduced rework. Although the shear fitting has been described in language specific to structural features and/or methodological acts, it is to be understood that the device defined in the appended claims is not necessarily limited to the specific features or acts described. Rather, the specific features and acts are disclosed as exemplary forms of implementing the claimed system and method.

What is claimed is:

1. A method of securing a cargo roller tray to a support beam of an aircraft, the method comprising:
   fastening a first lug of a shear fitting to the cargo roller tray using a first fastener in a first lug aperture of the first lug;
   fastening a second lug of the shear fitting to the cargo roller tray using a second fastener in a second lug aperture of the second lug, the first lug and the second lug being parallel and extending from a base of the shear fitting;
   adjusting a position of the base within a predetermined distance along the support beam, the predetermined distance being defined by at least one slot in the base; and
   fastening the base to the support beam of the aircraft using a third fastener in the slot of the base.

2. The method of claim 1, further comprising:
   fastening a first web extender of the shear fitting to a flange of the support beam using a fourth fastener in a first web aperture of the first web extender, the first web extender perpendicular to and extending from the first lug; and
   fastening a second web extender of the shear fitting to the flange of the support beam using a fifth fastener in a second web aperture of the second web extender, the second web extender perpendicular to and extending from the second lug.

3. A method of securing a structure to a support beam, the method comprising:
   fastening a first lug of a shear fitting to the structure via a first lug aperture in the first lug;
   fastening a second lug of the shear fitting to the structure via a second lug aperture in the second lug, the first lug and the second lug being parallel and extending from a base of the shear fitting;
   fastening the base to the support beam via at least one slot in the base; and
   fastening a web extender of the shear fitting to a flange of the support beam via a web aperture in the web extender, the web extender perpendicular to and extending from the first lug.

4. The method of claim 3, further comprising adjusting a position of the base within a predetermined distance along the support beam, the predetermined distance being defined by the at least one slot.

5. The method of claim 3, further comprising:
   fastening a first web extender of the shear fitting to a flange of the support beam via a first web aperture in the first web extender, the first web extender perpendicular to and extending from the first lug; and
   fastening a second web extender of the shear fitting to the flange of the support beam via a second web aperture in the second web extender, the second web extender perpendicular to and extending from the second lug.

6. The method of claim 5, wherein the first web extender and the second web extender are aligned along a same plane.

7. The method of claim 3, wherein the fastening the base to the support beam includes fastening the base to the support beam using fasteners in two or more slots in the base.

8. The method of claim 3, further comprising receiving the shear fitting into the support beam, wherein the support beam has at least two notches to receive the first lug and the second lug of the shear fitting.

9. The method of claim 3, wherein the structure is one of a cargo roller tray and at least a portion of an passenger cabin.

10. The method of claim 3, wherein the support beam is a support beam of an aircraft.

11. The method of claim 3, wherein the structure is one of a cargo roller tray or at least a portion of a passenger cabin, and further wherein the support beam is a support beam of an aircraft.

12. A method of securing a structure to a support beam, the method comprising:
fastening a first lug of a shear fitting to the structure via a first lug aperture in the first lug;
fastening a second lug of the shear fitting to the structure via a second lug aperture in the second lug, the first lug and the second lug being parallel and extending from a base of the shear fitting;
fastening a first web extender of the shear fitting to a flange of the support beam via a first web aperture in the first web extender, the first web extender perpendicular to and extending from the first lug; and
fastening a second web extender of the shear fitting to the flange of the support beam via a second web aperture in the second web extender, the second web extender perpendicular to and extending from the second lug.

13. The method of claim 12, wherein the first web extender and the second web extender are aligned along a same plane.

14. The method of claim 12, wherein the fastening the base to the support beam includes fastening the base to the support beam using fasteners in two or more slots in the base.

15. The method of claim 12, further comprising receiving the shear fitting into the support beam, wherein the support beam has at least two notches to receive the first lug and the second lug of the shear fitting.

16. The method of claim 12, wherein the structure is one of a cargo roller tray and at least a portion of an passenger cabin.

17. The method of claim 12, wherein the support beam is a support beam of an aircraft.

18. The method of claim 12, wherein the structure is one of a cargo roller tray or at least a portion of a passenger cabin, and further wherein the support beam is a support beam of an aircraft.

* * * * *